No. 744,734. Patented November 24, 1903.

UNITED STATES PATENT OFFICE.

JESSE C. EVANS, OF GREENSBORO, NORTH CAROLINA.

SIZING COMPOUND.

SPECIFICATION forming part of Letters Patent No. 744,734, dated November 24, 1903.

Application filed May 16, 1903. Serial No. 157,473. (No specimens.)

*To all whom it may concern:*

Be it known that I, JESSE C. EVANS, a citizen of the United States, residing at Greensboro, in the county of Guilford and State of North Carolina, have invented certain new and useful Improvements in Sizing Compounds, of which the following is a specification.

The primary object of this invention is the provision of a mixture for treating threads, such as cotton-warp, to facilitate their separation in beaming and weaving and prevent the eyes of the heddles from rusting.

In preparing the compound the following ingredients are combined in about the proportions stated, *i. e.*: paraffin-oil, one hundred pounds; paraffin-wax, twenty-five pounds; sal-soda, one pound; borax, 4 ounces; sulfate soda, 4 ounces. The constituents are mixed and boiled for about one-half hour. The paraffin-oil serves to soften the yarn and cause the threads to part more easily during the beaming and weaving operations and to prevent the heddle-eyes from rusting. The paraffin-wax lays the fiber and prevents linting in weaving. The alkali contained in the sal-soda, borax, and sulfate of soda cuts the oil and fatty matter of the paraffin oil and wax and insures a thorough admixture thereof, thereby preventing separation of the ingredients and insuring a combining essential to a perfectly-smooth compound.

It will be observed that the compound is free from moisture, and under ordinary temperature is of the consistency of lard or paste and will not freeze in the coldest weather or ferment in warm weather or places.

Having thus described the invention, what is claimed as new is—

The herein-described sizing compound composed of paraffin-oil, paraffin-wax, sal-soda, borax and sulfate of soda in about the proportions specified.

In testimony whereof I affix my signature in presence of two witnesses.

JESSE C. EVANS. [L. S.]

Witnesses:
   A. O. RUDD,
   W. T. ROYSTER.